United States Patent [19]

Ofenleger

[11] 4,006,450
[45] Feb. 1, 1977

[54] VEHICLE BURGLAR ALARM WITH INTERIOR CONTROL SWITCH

[76] Inventor: Gerd Ofenleger, Pleasant Acres, East Waterboro, Maine 04030

[22] Filed: Oct. 8, 1974

[21] Appl. No.: 513,103

[52] U.S. Cl. .......................... 340/63; 307/10 AT
[51] Int. Cl.² ........................................ B60R 25/10
[58] Field of Search ........... 340/63, 64; 307/10 AT; 180/114

[56] References Cited
UNITED STATES PATENTS

| | | | |
|---|---|---|---|
| 3,209,326 | 9/1965 | Heiser | 340/63 |
| 3,242,460 | 3/1966 | Morrell | 340/64 |
| 3,310,775 | 3/1967 | Birth | 340/63 |
| 3,649,962 | 3/1972 | Bedard et al. | 340/64 |
| 3,815,088 | 6/1974 | Kumpfbeck et al. | 340/63 |

*Primary Examiner*—John W. Caldwell
*Assistant Examiner*—Joseph E. Nowicki

[57] ABSTRACT

A vehicle burglar alarm system having an internal control switch. The control switch is located in a non-passenger compartment of the vehicle and a delay mechanism is provided to prevent sounding of an alarm during the period required to activate or de-activate the alarm.

8 Claims, 2 Drawing Figures

VEHICLE BURGLAR ALARM WITH INTERIOR CONTROL SWITCH

This invention relates to vehicle burglar alarm systems and more particularly to systems having a control switch within an enclosed compartment of the vehicle.

It has been previously recognized that in a vehicle alarm system it is desirable to have the control switch located in an enclosed portion of the vehicle. In this manner the necessity for an exterior key-activated alarm switch is eliminated with its vulnerability to tampering by a thief and difficulty of installation on some vehicles, for example, those having nonmetallic body structure.

Prior art systems having control mechanisms located within an enclosed portion of the vehicle have been described by Bedard in U.S. Pat. No. 3,649,962 and Shottenfeld in U.S. Pat. No. 3,531,793. These prior art systems have control switches located within the passenger compartment of the vehicle, typically the ignition switch. Disadvantages of these prior art systems include their complexity, requiring multiple time delays for activation of the alarm system following turning off of the ignition and for allowing delayed alarm for authorized entry into the vehicle, and difficulty of installation. Another disadvantage of this type system is the delay in sounding the alarm following entry into the passenger compartment of the vehicle.

OBJECTS OF THE INVENTION

It is therefore an object of the present invention to provide a vehicle alarm system having a control switch in an enclosed compartment of the vehicle.

It is a further object of the present invention to provide such a system wherein the alarm is activated immediately upon unauthorized entry into the passenger compartment of the vehicle.

It is a still further object of the present invention to provide such a system which is simple and inexpensive to install in a vehicle.

SUMMARY OF THE INVENTION

In accordance with the present invention there is provided a vehicle burglar alarm system which includes an alarm circuit comprising alarm means, responsive to an applied electrical voltage for signalling an alarm and means for supplying the electrical voltage. The alarm circuit further includes switch means, responsive to the opening of the passenger compartment of the vehicle for applying the electrical voltage to the alarm signalling means. Finally, the alarm circuit includes delayed switching means, responsive to the opening of a non-passenger compartment of the vehicle, for applying the electrical voltage to the alarm signalling means a selected time after the opening of the non-passenger compartment. The alarm system also includes control switching means, located in the nonpassenger compartment, for selectively opening or closing said alarm circuit.

For a better understanding of the present invention, together with other and further objects thereof, reference is had to the following description, taken in conjunction with the accompanying drawings and its scope will be pointed out in the appended claims.

DESCRIPTION AND OPERATION OF THE EMBODIMENT OF FIG. 1

Figure 1:
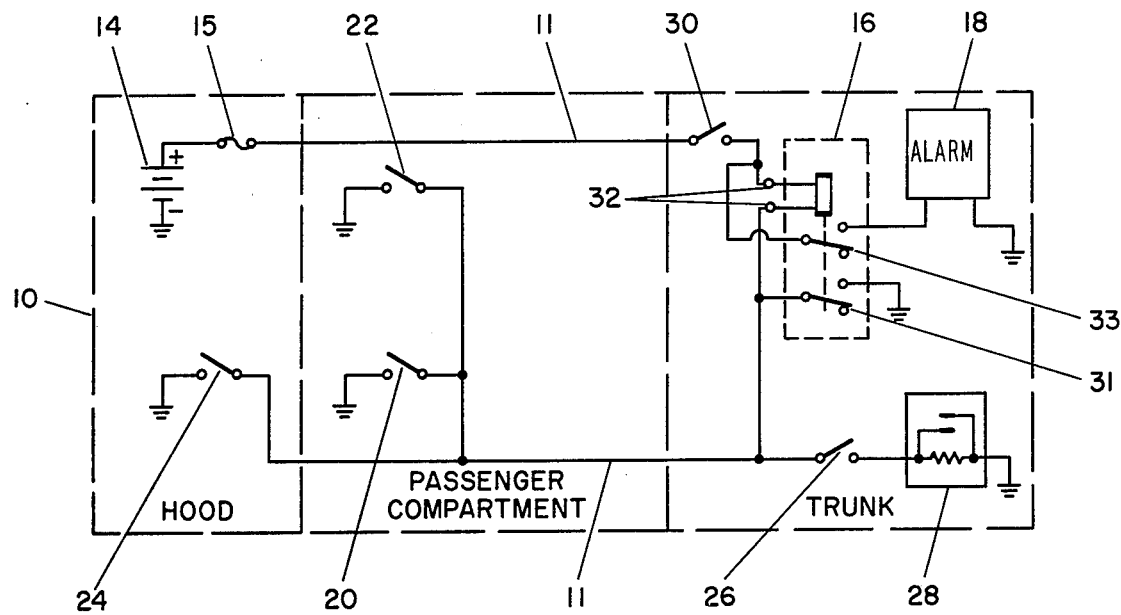
FIG. 1 is a schematic diagram of an embodiment of the present invention.

Shown in FIG. 1 in a dotted outline 10 representing a motor vehicle, in particular a two door automobile. Shown by the outline are three compartments of the automobile, a passenger compartment, a motor compartment, labelled "hood" and a luggage compartment, labelled "trunk." Installed on motor vehicle 10 is an alarm system constructed in accordance with the present invention.

The alarm system includes an alarm circuit 11 which includes alarm means 18 which may be a siren, pulsating horn, flashing light, radio alarm or combination of these or similar devices to alert witnesses to the fact that there is an unauthorized entry into the vehicle. Those skilled in the art will recognize that the automobile horn may be used for this purpose. Alarm means 18 is activated in response to an applied electrical voltage. In the illustrated embodiment, one terminal of alarm means 18 is grounded to the vehicle chassis, so that a voltage need only be applied to the other lead to activate the alarm. In the embodiment of FIG. 1 the alarm means is illustrated as being located in the luggage compartment of the vehicle. This location is convenient for purposes of installation, but as will become evident, the alarm means may be located at any desired place on the vehicle.

The alarm circuit 11 additionally includes means for supplying an electrical voltage, which in the FIG. 1 embodiment comprises vehicle battery 14. The illustrated circuit also includes fuse 15 for purposes of preventing an electrical fire in the vehicle should a short circuit occur in alarm circuit 11. Control switch 30 is provided for opening and closing alarm circuit 11. Control switch 30 is located in the luggage compartment of vehicle 10, which is a preferred location, but as will become evident, control switch 30 may also be located in any selected non-passenger compartment, such as the motor compartment. Control switch 30 is preferably a key operated switch to prevent unauthorized operation.

Also included in alarm circuit 11 is latching relay 16, which in the illustrated embodiment comprises a two pole relay. Relay 16 closes in response to a voltage applied across terminals 32. Pole 33 of relay 16, upon closing causes the voltage of battery 14 to be applied to alarm means 18. Pole 31 of relay 16 causes one of terminals 32 to be grounded, thereby keeping relay 16 closed as long as switch 30 is closed.

As is evident from FIG. 1, alarm circuit 11 includes grounded switches 20, 22 and 24 which upon closing cause a voltage to be applied to relay 16, thereby causing a voltage to be applied to alarm means 18. Switches 20 and 22 are closed in response to the opening of the passenger compartment of vehicle 10. Switch 24 is closed in response to opening of the motor compartment of vehicle 10.

There is finally included in alarm circuit 11, switch 26 and thermal time delay 28. Switch 26 is closed in response to the opening of the luggage compartment of vehicle 10. Upon closing of switch 26, when control switch 30 is in the closed position, a voltage is applied across normally open thermal relay 28. This voltage results from the fact that absent a significant current flow through the coil of relay 16, there is no voltage drop across terminals 31 and the voltage of battery 14 is applied to thermal relay 28. A selected time after closing of Switch 26, Thermal relay 28 reaches closing temperature, the contacts close, and one terminal of latching relay 16 is connected to ground, thereby closing relay 16 and applying a voltage to alarm means 18.

From a consideration of the above described circuit, the operation of the embodiment of FIG. 1 will become evident. Upon parking the vehicle and closing all of the doors, the operator must open the luggage compartment and close control switch 30. Since, at this time, the luggage compartment lid is open, switch 26 is closed and the voltage from battery 14 is applied across normally open thermal relay 28. In order to avoid sounding the alarm, the operator must close the trunk lid, opening switch 26 within the delay time associated with thermal relay 28. Typically, this delay time would be selected to be approximately 15 to 30 seconds.

Upon closing the trunk lid, the alarm system is in an alert condition. If an intruder were to open the motor compartment or passenger compartment by either of the doors, the closing of one of switches 20, 22 or 24 would cause relay 16 to activate, thereby applying a voltage to alarm means 18. Relay 16 is arranged such that even upon closing of the door by which the intruder entered, the alarm would continue to sound until control switch 30 is opened. Since control switch 30 is located in the luggage compartment, it is unlikely that an intruder, once having activated the alarm, will remain in the vicinity of the vehicle for a sufficient period to locate and open switch 30. In a preferred embodiment switch 30 would be key activated, thereby making de-activation even more difficult.

If an intruder were to open the luggage compartment of the vehicle, while the alarm system is in an alert condition, switch 26 would close, applying the voltage across thermal relay 28. After the time delay associated with relay 28, the alarm would sound and continue until switch 30 were opened. It is most likely that the intruder would not upon sounding the alarm, delay in the vicinity of the vehicle until he could locate and open switch 30, or in the event switch 30 is key operated, disable the system.

Assuming the alarm has not been activated by an intruder, an authorized operator of the vehicle, upon return to the vehicle must first open the luggage compartment, and during the time delay period open control switch 30 to de-activate the alarm circuit prior to entering the vehicle. If the alarm has been activated, it may be deactivated by opening the luggage compartment and opening switch 30.

DESCRIPTION OF THE EMBODIMENT OF FIG. 2

Figure 2:
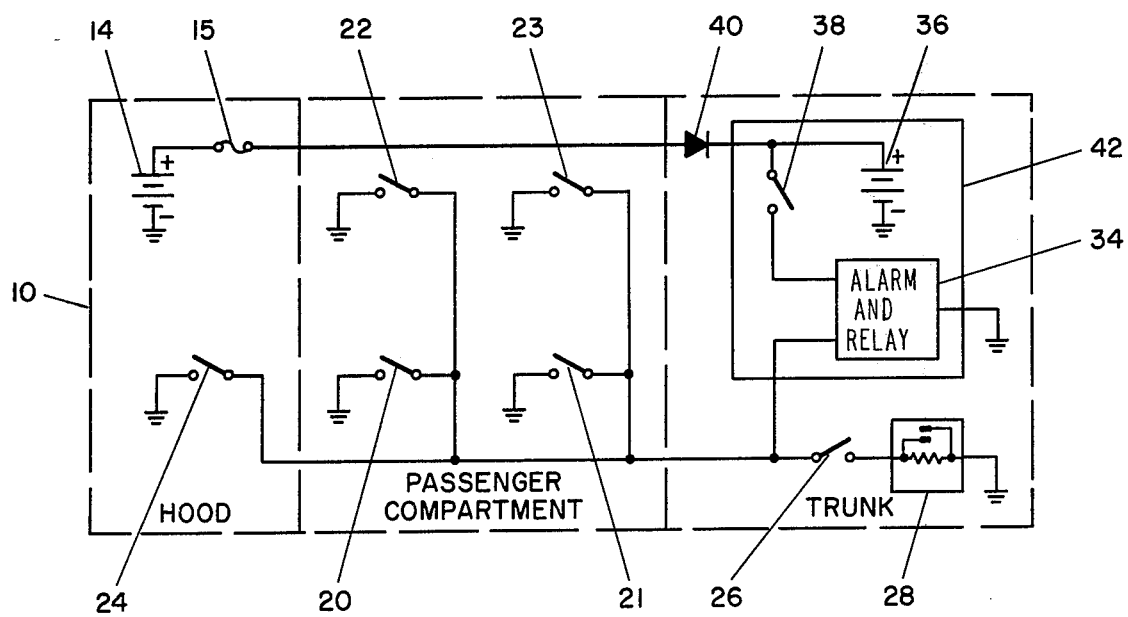
FIG. 2 is a schematic diagram of another embodiment of the present invention.

FIG. 2 shows an alternate embodiment of the invention. In the FIG. 2 embodiment, which illustrates an installation of the invention on a 4-door vehicle, there is provided an alarm battery 36 in addition to the vehicle battery 14. Latching relay 16 and alarm means 18 have been included in unit 34, which may alternately include other alarm or relay circuit arrangements.

Alarm battery 36 in the FIG. 2 embodiment is connected to vehicle battery 14 by diode 40 to allow charging of alarm battery 36 and prevent excessive discharge during vehicle starting or other high load conditions.

Switch 38 is provided to connect alarm battery 36 to unit 34 for activation of the alarm system.

Two advantages accrue from having a separate alarm battery 36. First, battery 36, switch 38 and alarm means 34 may be located in metal box 42 and firmly attached within the vehicle trunk. Assuming switch 38 is key activated, once alarm 34 has been activated, an intruder cannot deactivate the alarm without entry into metal box 42. Further, the alarm system is not disabled if an intruder disconnects vehicle battery 14 in an attempt to tamper with the alarm. Battery 36 charges automatically during normal operation of the vehicle.

While there have been described what are at present believed to be the preferred embodiments of the present invention, it will be evident to those skilled in the art that various changes and modifications may be made therein without departing from the invention, and it is, therefore, aimed to cover all such changes and modifications as fall within the true spirit and scope of the invention.

What is claimed is:

1. A vehicle burglar alarm system, usable in a vehicle having a passenger compartment and at least one non-passenger compartment, comprising:
   1. an alarm circuit, comprising:
      a. alarm means, responsive to an applied electrical voltage, for signalling an alarm;
      b. means for supplying said electrical voltage;
      c. first switching means, responsive to the opening of said passenger compartment, for applying said electrical voltage to said alarm signalling means; and
      d. second switching means, closed in response to the opening of said non-passenger compartment, for applying said electrical voltage to said alarm signalling means when closed;
   2. control switching means located in said non-passenger compartment, for selectively opening or closing said alarm circuit;
   3. and a single time delay for delaying application of said electrical voltage to said alarm means for a selected time after closing of said control switching means when said second switching means is closed, and also for delaying application of said electrical voltage to said alarm means for a selected time after closing of said second switching means when said control switching means is closed.

2. An alarm system as specified in claim 1, wherein said alarm means includes a latching relay, for causing a continuous signalling of said alarm, connected to said voltage supplying means and responsive to the application of said electrical voltage by either said first or second switching means.

3. An alarm system as specified in claim 1, wherein said vehicle has more than one non-passenger compartment and wherein said control switching means is located in a selected one of said non-passenger compartments and wherein said alarm circuit additionally includes switch means, responsive to the opening of at least one of the remaining non-passenger compartments, for applying said electrical voltage to said signalling means.

4. An alarm system as specified in claim 3, wherein said selected non-passenger compartment is the luggage compartment of said vehicle.

5. Apparatus as specified in claim 1, wherein said means for supplying an electrical voltage comprise a battery.

6. Apparatus as specified in claim 1 wherein said time delay comprises a thermal relay.

7. Apparatus as specified in claim 1, usable in a vehicle having a battery, wherein said means for supplying an electrical voltage comprises an alarm battery, which is provided in addition to the battery of said vehicle.

8. Apparatus as specified in claim 7 wherein there is additionally included means for recharging said alarm battery during operation of said vehicle.